Jan. 10, 1961 D. H. APGAR 2,968,003
REVERSIBLE ELECTRONIC COUNTER
Filed Dec. 19, 1957
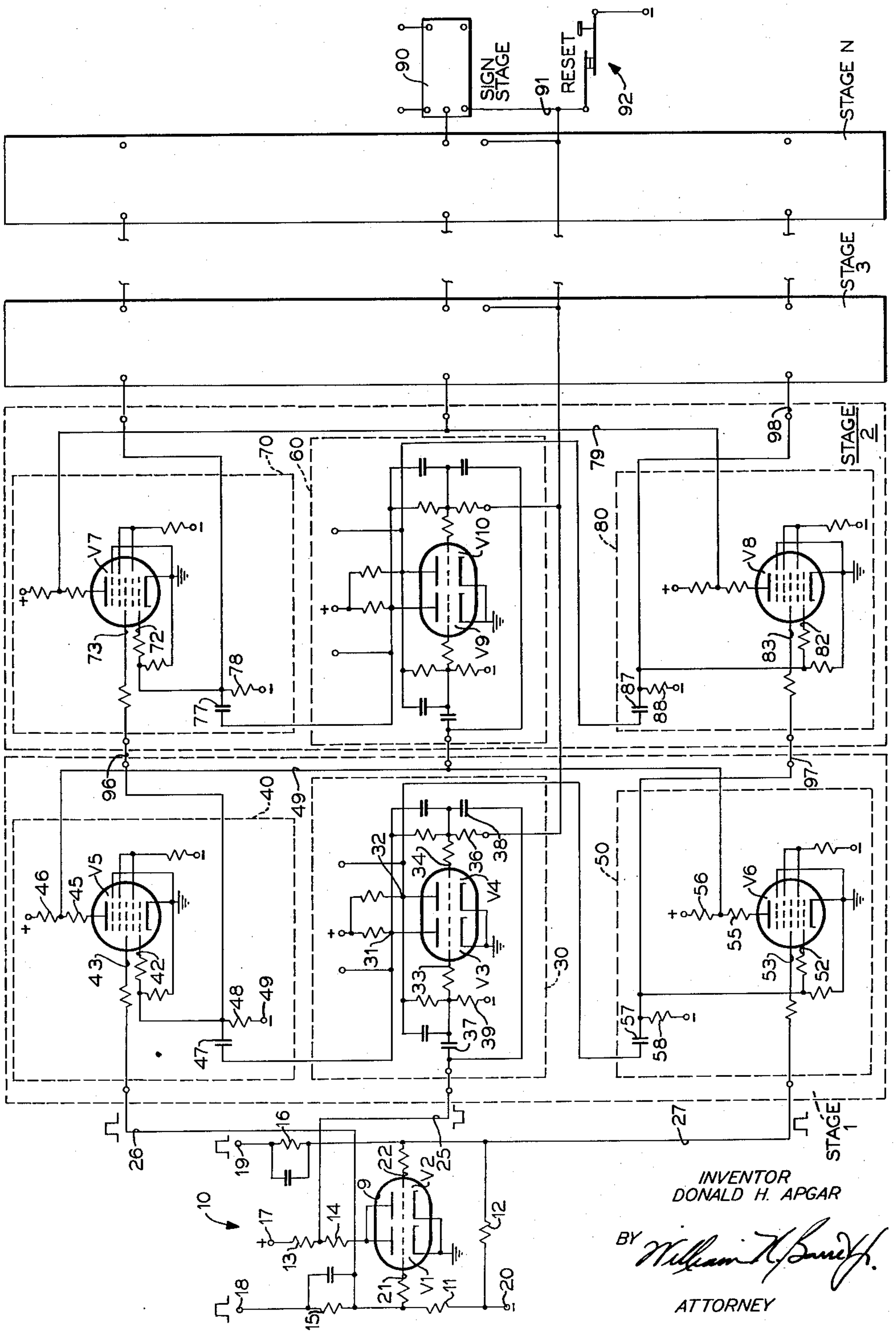
INVENTOR
DONALD H. APGAR
BY William H. Bauer Jr.
ATTORNEY 2,968,003
Patented Jan. 10, 1961

2,968,003

REVERSIBLE ELECTRONIC COUNTER

Donald H. Apgar, Binghamton, N.Y., assignor to International Business Machines Corporation, New York, N.Y., a corporation of New York Filed Dec. 19, 1957, Ser. No. 703,790

3 Claims. (Cl. 328—44)

The invention relates to counters and in particular to a reversible electronic counter.

Forward-reverse counters such as the one described herein find many applications in digital computing circuits. In particular, this type of counter is used extensively for storing a number indicative of the desired position of a controlled member (e.g., receiver motor shaft of a follow-up system) as a forward or reverse characterized series of digits (dependent upon the initial position of the member and the desired position) and, as the member moves toward this position, pulses are generated by movement of the member in the opposite sense to those stored, so that the number set in the counter will be pulsed to zero.

One disadvantage of known reversible counters has been the necessity for limiting the input pulse rate or frequency to allow for the maximum number of carry-overs which could occur between any given number of successive stages. In this invention, by providing a self-generating carry pulse for each stage of the counter, the frequency at which the counter can operate will be limited solely by the rate of response of the individual stage. A corollary advantage is therefore the fact that any given number of stages can be used without effecting the allowable input pulse rate.

It is therefore an object of this invention to provide a new and improved reversible counter.

It is another object of this invention to provide a reversible counter that has a frequency response limited solely by the response time of an individual stage of the counter.

Another object of this invention is that any number of stages may be used in the counter without adversely affecting the frequency response of the counter.

Other objects of the invention will be pointed out in the following description and claims and illustrated in the accompanying drawings, which disclose, by way of examples, the principle of the invention and the best mode, which has been contemplated, of applying that principle.

In the drawings:

The single figure diagrammatically shows the circuit of the reversible counter of the present invention with the input and two stages of the counter in detail and the remainder in block form.

In general, the reversible counter of the present invention consists of a plurality of stages 1–N which perform the counting operation and store the results. The counter operates on binary numbers and each stage, 1 to N, represents a successively higher denomination of two in accordance with the series $$a_0 2^0 + a_1 2^1 + a_2 2^2 \ . \ . \ . \ a_N 2^N$$

where "$a$" is "0" or "1" and is determined by the state of a multi-stable storage element, e.g., 30, contained in each stage. Associated with each storage element in each stage is a forward pulse carry circuit, e.g., 40, for sensing the condition of the preceding stage and the stage with which it is associated to generate a forward carry pulse to the next storage element, e.g., 60, when these two stages have a "1" stored therein and each are being switched to "0." Also associated with each storage element, e.g., 30, is a reverse carry circuit, e.g., 50, for generating a reverse carry pulse when two adjacent stages have a "0" stored therein and each is being switched to "1." To indicate the sign of the content of the counter as forward or reverse, an additional storage element 90 is connected to the output of the Nth stage.

An inverter switch 10 has been shown at the input to stage 1 to provide a logical transition from two mutually exclusive series of pulses where the pulses occur at either input 18 or 19 to the three series of pulses (although only two are present at any one pulse interval) which are used in the counting operation.

The inverter switch 10 consists of two triodes V1 and V2 utilized as a double inverter. These are negatively biased through grid resistors 11 and 12 near cutoff by a voltage supply 20 so that the voltage at the center tap of plate resistors 13 and 14 is approximately at the level of the plate supply voltage 17. When a "forward" or "reverse" positive-going pulse appears on input terminals 18 or 19, respectively, and consequently across resistors 15 and 11, or 16 and 12, respectively, the grid 21 or 22 of the respective triode V1 or V2 rises and the particular triode conducts more heavily. The voltage at the center tap of the plate resistors 13 and 14 thereby drops to a voltage approximately two-thirds the value of the plate supply voltage 17 to generate a negative-going pulse over the line 25. A "forward" or "reverse" pulse at terminals 18 or 19, respectively, undergoes a change in level by reason of the negative bias applied to resistors 15 and 11 and 16 and 12 and appears as a positive pulse at the input of the first stage of the counter on either line 26 or 27 depending on whether the pulse is forward or reverse at the same instant that the pulse from the plate of double inverter appears on the line 25 to the trigger circuit 30.

Illustrated in the center portion of stage 1 is a multistable storage element or trigger circuit 30 consisting of two triodes V3 and V4 connected for mutually exclusive operation by means of the plate to grid connections from 31 to 34 and from 32 to 33 between tubes. This is a conventional circuit operated by negative-going pulses applied to the grids 33 and 34 through capacitors 37 and 38 and across bias resistors 39 and 36. The tubes are biased by negative voltages applied at the terminals of resistors 39 and 36. A normally closed reset switch 92 is included in the line 91 connected to the grids of the right-hand tubes in the storage elements and its negative voltage supply. The sign stage is connected opposite to the storage stages in that the left-hand tube contained therein has its grid connected to line 91. The trigger circuit 30 is not affected by positive excursion pulses since this merely increases the current flow through the conducting tube. As in other trigger circuits, the plates of the respective tubes are connected to the grids of the opposite tube so that, when conducting and with a lowered plate voltage, the opposite tube with grid connected thereto will be kept nonconducting.

In this particular counter circuit, the storage element is said to be "Off" or at a binary "0" condition when the right triode V4 is conducting and left tube V3 is nonconducting. For an "On" condition or binary "1," the opposite condition prevails.

Each stage is reset to "0" by opening the reset switch 92 and removing the negative bias applied to the grids of the tubes connected to line 91. This allows these grids to assume a positive voltage and assure conduction of the related tube. In this respect it can be seen that if tube V4 is cut off and the counter is reset, the plate voltage at terminal 31 of tube V3 will be applied to the grid 34 of V4 to cause conduction in V4 and the storage element 30 will reverse states to indicate a binary "0." If tube V4 is conducting when the counter is reset, it will remain conducting since the grid 34 of tube V4 is biased by means of the voltage applied from terminal 31.

Associated with the storage element 30 is a forward carry circuit 40 and a reverse carry circuit 50. Since each carry circuit includes the same circuit, only the forward carry circuit 40 will be described. Included in circuit 40 is a pentagrid coincidence tube V5 which conducts when positive voltages above a certain level are applied to the control grids 42 and 43. Both grids must be above this level before the tube will conduct. This may be referred to as an "And" gate. The tubes V5 and V6 in each carry circuit have a common line 49 connected between resistors 45 and 46 of circuit 40, resistors 55 and 56 of circuit 50, and the input of storage element 60 of stage 2.

A capacitor 47 between the plate 31 of the tube V3 of the trigger circuit 30 and the grid 42 of the pentagrid coincidence tube V5 prevents the steady state plate voltage of the triode V3 from appearing on the control grid 42 of the pentagrid, but allows a change in plate voltage of the trigger circuit tube V3 to be reflected on the control grid 42. A negative bias supply 49 applied to resistor 48 prevents conduction of the coincidence tube V5 in a steady state condition of the trigger circuit. The rapidity with which a pulse through the coupling circuit will decay toward a steady state condition is dependent on the RC constant of the capacitor 47 and resistance 48. From the junction points of resistance 48 and capacitor 47, a connection is made to the control grid 73 of the coincidence tube V7 of stage 2. The reverse carry circuit 50 is identical in construction and operation to the forward carry circuit 40 except that control grid 52 is connected to plate 32 of tube V4 of the trigger circuit and control grid 53 is connected to the reverse pulse input line 27.

The trigger circuit 80 at the last position of the counter is a sign circuit and indicates whether the sign is forward or reverse dependent upon the algebraic sum of the number of pulses of each kind which have been entered into the counter. This trigger is normally reset with left tube conducting and right tube nonconducting to indicate a forward count at zero (opposite to the remaining stages with a "0" stored therein). If the first pulse is a reverse pulse, the trigger will be switched to indicate a reverse quantity in the counter.

The counter is normally reset to zero at the beginning of each operation and the sign stage is set at a forward indication by opening the reset switch 92. If a forward pulse counting operation is considered, the counter presents the format of a binary progression in which stage 1 is turned "On" and "Off" by successive input pulses while successive stages are turned "On" and "Off" in accordance with their place in the progression, i.e., stage 2 operates once for every two pulses recorded by stage 1.

If the first pulse to be entered into the counter after a reset operation is a reverse pulse, each storage element, 30, 60, etc., will reverse state, in a manner to be described hereinafter, along with sign stage 90 which will then indicate a reverse count being stored. The storage elements will then indicate a binary "1" in accordance with the convention described previously so that if there were five stages, the stages would indicate 11111 for a decimal count of 31 with the sign stage 90 indicating a reverse count.

In this method of counting, the sign stage can be considered to be a further storage element so that when the counter is standing at zero and the sign state is "On," the counter can be said to be indicating a decimal count of 32. A forward pulse would then raise the count to 33 while a reverse pulse would lower the count to 31.

As an alternate method of summation, the terminology applied to each trigger for an indication of "1" and "0" is reversed so that the counter can be said to be standing at a reverse zero. This latter method is utilized by taking an output from each triode at the plates 31, 32, etc., and controlling by means of the sign stage, which output shall be effective to determine the count contained in the counter. To this end it is evident that if stage 1 has stored therein a forward binary "1," then tube V4 is nonconducting and the plate voltage at 32 is high while the plate voltage at 31 is low so that by uitlizing an output 32 from the plate of tube V4, the binary digit stored in storage element 30 can be determined to be "1" or "0" in accordance with whether the output is high or low (remembering that the plate of V4 is low when a binary "0" is stored in element 30). For a reverse count in the counter, and using the alternate terminology wherein tube V4 would be conducting and tube V3 would be nonconducting for a binary "1," the output of tubes V3, V9, etc., should be used so that when the plates of these tubes are at a high voltage level, there would be a reverse count of "1" stored in that stage.

In the operation of the present invention, a forward or reverse pulse appears at the input 18 or 19, respectively, to the inverter switch 10 and through the coupling resistors 15 or 16 to the forward or reverse coincidence tube V5 or V6, respectively. At the same time, the inverter 9 is driven into conduction and a negative-going pulse is transmitted to the trigger circuit 30 of stage 1.

Assume that the counter is standing at binary 11 (for the two stages 1 and 2) which indicates that in the storage elements 30 and 60, the left tubes V3 and V9 are conducting and the right tubes V4 and V10 are nonconducting so that the voltage at the plate 31 will be at a low value for the left tubes V3 and V9. With a forward input pulse to the storage element 30, the left tube V3 will be cut off, the plate voltage at 31 will rise, and this positive excursion of voltage will be reflected on the control grid 42 of the forward coincidence tube V5 during a common time interval with the pulse from the inverter 9 connected by line 26 to control grid 43. With positive voltage on each grid, the coincidence tube V5 will conduct and the plate voltage between resistors 45 and 46 will drop to transmit a negative excursion carry pulse to the trigger circuit 60 of the next stage 2. In addition, the positive excursion pulse from the plate 31 of tube V3 is transmitted through the condenser 47 over line 96 to the control grid 73 of the forward coincidence tube V7 in the carry circuit 70 of stage 2 as a sign carry pulse to control this coincidence tube V7. Stage 2 operates in the same manner as stage 1 to furnish two pulses to the succeeding stage 3 and this operation continues through subsequent stages until a stage is reached in which a "0" is stored (left tube nonconducting) wherein the operation of the trigger stores a "1" in that stage, but the negative excursion pulse from the left tube of the trigger does not produce a forward sign carry for the coincidence tube associated with that stage so that the action is then terminated.

Each time a positive excursion pulse appears across condenser 47, stage 1, the condenser 57 will have a negative pulse impressed thereon since plate 32 is going from a high to a low voltage level which will prevent any conduction in tube V6. When a storage element, e.g., 30, goes from binary "0" to "1," V4 goes from conducting to nonconducting and a positive pulse will appear on grid 52 of tube V6. If a pulse is present on line 27 and consequently grid 53 (indicating reverse counting), the tube V6 would conduct to switch storage 60 and a reverse sign control pulse would be directed to reverse carry circuit 80. If there is no reverse pulse on line 27, there will, of course, be no conduction in tube V6 and consequently no carry pulse to storage element 60 or sign control pulse to carry circuit 89.

As an example of reverse counting, it will be assumed that stage 1 has a "0" stored therein (tube V4 conducting), stage 2 has a "0" stored therein, and stage 3 has a "1" stored therein with the sign stage indicating a forward direction of counting. A sign control pulse on line 27 and a counter pulse on line 25 will direct a pulse to control grid 53 and, since tube V4 will now switch to a nonconducting state, a positive pulse will appear across condenser 57 and be directed to grid 52 and by line 97 to grid 83 of tube V8. Stage 1 has now been set to binary "1."

The pulses on line 97 and line 49 will act in the same manner as that described in connection with the pulses on lines 27 and 25 and stage 2 will be switched from a binary "0" to a binary "1."

The pulses on lines 79 and 98 will act in the same manner as described with reference to stage 2 except that in this case the storage element is set at binary "1" (left tube nonconducting) so that when this element is switched a negative pulse will be generated and there will be no carry to the next succeeding stage.

The count standing in the counter at the initial condition binary 001 (decimal 4) has been reduced to binary 110 (decimal 3) by the introduction of a reverse pulse. It can be readily seen from this explanation that when the counter is initially reset to zero, a reverse pulse introduced to stage 1 will successively reverse all stages standing at binary "0" to a binary "1." The sign storage element being the last element contained in the counter will be switched and the action will cease.

Each carry circuit therefore senses the change in condition of the storage element in the preceding stage and the change in condition of the storage element in the same stage to generate a pulse for the succeeding stage when certain conditions are met. For the forward carry circuit each storage element must be going from "1" to "0," and for the reverse carry circuit each storage element must be going from "0" to "1."

Since each carry circuit is dependent only on its associated storage element and the immediately preceding stage, the frequency of response is limited substantially to the response of any one stage so that input pulses of opposite sign could occur alternately at any frequency up to the response time of stage 1. The response time of a storage element or trigger circuit is made up of the transition time which is the time from the beginning of a trigger pulse until a time when the trigger will continue to change state even though the trigger pulse is removed and the recovery time which is the additional time required for the trigger to completely establish itself in the new state.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A binary counter comprising a series of multistable storage elements operable to alternate states indicative of binary "1" or "0" in response to successive input pulses, said storage elements each having a plurality of output terminals having voltages indicative of the state of said element, and AND circuit associated with each storage element means for generating a self-sustaining carryover pulse from a given stage to the next successive stage in response to a change in state of a preceding stage and a corresponding change in state of the given stage in response to the change of state of said preceding device, said last-mentioned means comprising means for connecting one output terminal of the element associated with said AND circuit to said AND circuit, means for connecting a similar one of said output terminals of said preceding element to said AND circuit, and means included in the connections between the output terminals and said AND circuit for providing an indication to said AND circuit of a change in state of said multistable storage elements whereby a positive rise of voltage on the terminal of a preceding storage element and a positive rise in voltage on said output terminal of the associated storage element will enable said AND circuit, and means for connecting the output of said AND circuit to the next successive storage element to change the state of said element.

2. A binary counter comprising a series of flip-flops operable to alternate stable states indicative of a binary "1" or "0" by pulses applied to the input, output terminals from each flip-flop having voltages indicative of the state of said flip-flop, an AND circuit associated with each with said flip-flop, means for generating a self-sustaining carryover pulse from a given stage to the next successive stage in response to a change in state of a preceding stage and a corresponding change in state of the given stage in response to the change of state of said preceding device, said last-mentioned means comprising means connecting one output of the element associated with said AND circuit to said AND circuit, means connecting a similar one of said output terminals of a preceding device to said AND circuit, a capacitor contained in each said connecting means to isolate constant voltages from said AND circuit, said AND circuit being responsive to a positive rise in voltage on the output terminal of a preceding element and a predetermined change in voltage on the output terminal of said associated device to provide a pulse output, and means for connecting the output of said AND circuit to the input of the succeeding flip-flop.

3. The apparatus of claim 2 further including an AND circuit connected to opposite output terminals of said flip-flops and responsive to predetermined changes in voltages of said output terminals to provide a pulse to the next succeeding stage whereby forward or reverse input pulses may be entered into said counter.

References Cited in the file of this patent

UNITED STATES PATENTS

| | | |
|---|---|---|
| 2,519,763 | Hoglund | Aug. 22, 1950 |
| 2,557,186 | Hamacher | June 19, 1951 |
| 2,735,005 | Steele | Feb. 14, 1956 |